United States Patent [19]

Shifflet, Jr.

[11] 4,100,534

[45] Jul. 11, 1978

[54] ELECTRONIC SECURITY SYSTEM

[75] Inventor: Glynne W. Shifflet, Jr., Minneapolis, Minn.

[73] Assignee: Tuthill Corporation, Oak Brook, Ill.

[21] Appl. No.: 748,690

[22] Filed: Dec. 9, 1976

[51] Int. Cl.[2] .......................... H04Q 3/00; G06K 7/06

[52] U.S. Cl. ........................... 340/149 A; 235/92 CA; 340/146.2; 340/147 MD

[58] Field of Search ....... 340/147 MD, 149 R, 149 A, 340/146.2, 173 RC, 173 AM, 146.1 C; 235/92 CA, 92 PE

[56] References Cited

U.S. PATENT DOCUMENTS

| | | | |
|---|---|---|---|
| 3,484,744 | 12/1969 | Gertler et al. | 340/146.1 |
| 3,492,656 | 1/1970 | Hildebrandt | 340/172.5 |
| 3,587,051 | 6/1971 | Hovey | 340/147 MD |
| 3,694,757 | 9/1972 | Hanna, Jr. | 340/146.1 C |
| 3,800,284 | 3/1974 | Zucker et al. | 340/147 MD |
| 3,931,497 | 1/1976 | Gentile et al. | 340/149 A |
| 3,942,152 | 3/1976 | Pettersson | 340/146.2 X |
| 3,944,976 | 3/1976 | France | 340/146.2 |
| 3,997,764 | 12/1976 | Belmonte et al. | 235/92 CA |
| 3,999,181 | 12/1976 | Hirsch | 340/146.2 X |

*Primary Examiner*—Donald J. Yusko
*Attorney, Agent, or Firm*—Wayne A. Sivertson

[57] ABSTRACT

Apparatus for obtaining limited access to a given function in response to the entry of a preselected code sequence. A plurality of preselected code sequences are generated by the apparatus and compared sequentially with an entered code sequence. In the event that a generated code sequence has a preselected degree of coincidence with the entered code sequence, the desired function is enabled. A plurality of functions may be controlled by the same apparatus. Alternatively, a plurality of different code sequences may be employed to enable the same function while the apparatus individually monitors which code sequence is used to enable the function. In a preferred embodiment, the function being controlled is a fluid dispensing pump which is enabled by any one of a plurality of entered code sequences while the amount dispensed through the use of each entered code sequence is monitored individually. Provision is made for the collective and individual alteration of code sequences within the generated code sequences.

34 Claims, 5 Drawing Figures

ELECTRONIC SECURITY SYSTEM

BACKGROUND OF THE INVENTION

Controlling or limiting access to many functions is a long-standing practice. For example, mechanically operated locks, both keyed and combination, have been employed to restrict access to doors, and the like, to those that have the proper key or know the proper combination.

A major problem with mechanical locks is encountered when it becomes necessary to alter the mechanism to accept a different key or combination. Such situations arise when keys become lost or it is believed that the key or combination has fallen into unauthorized hands. Often, skilled workmen are required to perform the necessary alteration which may result in an undesirable delay. Also, unavailability of parts may cause even further delay.

Some of the difficulties with mechanical systems have been addressed by electronic lock systems which employ coded elements. Such coded elements have taken the form of cards which are typically magnetically encoded. These electronic systems can be designed to facilitate a change in the access code. Cards, however, are subject to loss, and, like mechanical keys, pilferage. Other electronic systems have employed memory circuits in which preselected access codes are stored. In addition to the memory devices, such systems require additional circuitry for addressing the various memory locations.

SUMMARY OF THE PRESENT INVENTION

The present invention provides an electronic system for controlling access to a given function that requires no external devices such as keys or cards, and employs no internal circuitry for storing preselected access codes and addressing the various access code storage locations. In a preferred embodiment, a six-digit access code is entered via a keyboard and compared with a series of preselected code sequences which are generated within the system. Coincidence between the entered code and one of the generated code sequences enables the desired function. Each generated code sequence may control a different function, the opening of different doors, for example. Alternatively, each generated code sequence may control the same ultimate function while monitoring the code by which access is gained, enabling a fluid dispensing pump with several different codes while individually monitoring the amount of fluid dispensed as a result of the use of each enabling code, for example. In either instance, a single keyboard may replace a bank of keys. Also, the heretofore necessary memory circuitry of some systems, and the associated circuitry necessary to utilize the memory circuits, is eliminated with the attending reduction in circuit complexity and cost.

DETAILED DESCRIPTION OF THE DRAWINGS

For the purposes of the specification and claims, the phrase "generating a plurality of preselected code sequences" is intended to embrace only the actual generation of such sequences as opposed to the utilization of previously generated and stored sequences.

Figure 1:
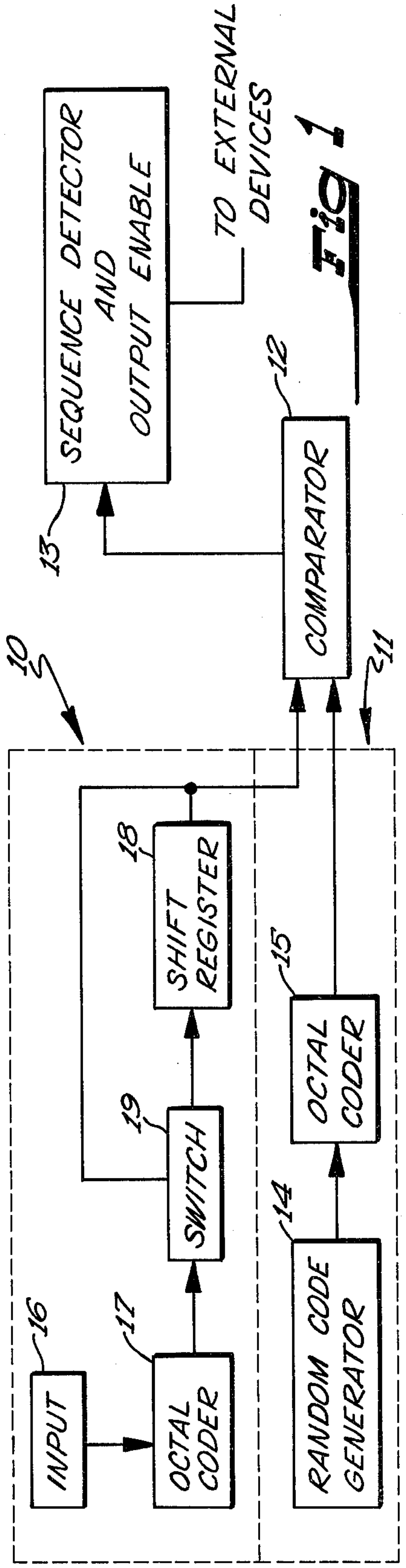
FIG. 1 is a schematic illustration of major functional elements forming the present invention and the flow of information between them.

Referring now to FIG. 1, there is shown a schematic diagram illustrating the several functional elements forming the present invention, and their interconnection. The several lines illustrate the flow of information between elements, not necessarily the complete interconnection between elements. For example, a single line in FIG. 1 may represent two or more actual connections between elements. Also, several control signals are generated by or under the control of the illustrated elements and used to control others of the illustrated elements. For clarity, these control signals are not illustrated in FIG. 1, although their generation and use are discussed with reference to the preferred embodiments of FIGS. 2–5.

An access code input channel 10 and an internal code generating channel 11 have their outputs connected to a comparator 12. The code generating channel 11 sequentially generates a series of code sequences each of which are compared to an access code entered via channel 10. The comparator 12 has its output connected to a sequence detector and output enable 13 and establishes the degree of coincidence between the code sequence entered via channel 10 and each code sequence generated by channel 11. The sequence detector and output enable 13 responds to a preselected degree of coincidence between the access or entered code sequence and one of the generated code sequences to enable an external device in predetermined correspondence with the entered code sequence. In a preferred embodiment, the generating channel 11 is disabled on the occurrence of the predetermined degree of coincidence between a generated code sequence and an entered code sequence and the rank of the last generated code sequence within the sequential plurality of generated code sequences is employed in sequence detector and output enable 13 to enable an external device in accordance with that rank.

As illustrated in FIG. 1, internal code generating channel 11 is formed of a random code generator 14 whose output is coded by an octal coder 15 and presented to comparator 12. The access or input channel 10 is formed of an input device 16 whose output is coded in octal by an octal coder 17. The output of octal coder 17 is connected to a shift register 18 via a double-throw switch 19 and the output of shift register 18 is connected to comparator 12 and to switch 19.

The greatest advantage of the present invention is attained through the use of a keyboard input for input 16. However, any other type of input device capable of entering a code sequence may be employed to advantage within the present invention. During entry of a code sequence, via input 16, random code generator 14 is disabled and switch 19 applies the coded input from octal decoder 17 directly to shift register 18. After entry of a code sequence at input 16, random code generator 14 sequentially generates a series of code sequences in a manner to be discussed more fully below. During the generation of code sequences in channel 11, switch 19 is connected to receive the output of shift register 18 and apply it again to the input of shift register 18. In this manner, a code sequence entered at input 16 is initially stored within shift register 18 and presented, digit by digit, to comparator 12 during each code sequence generated in channel 11. Comparator 12 gives a digit by digit comparison between code sequences generated in channel 11 and a code sequence entered in channel 10 and its output may be employed in any circuitry capable of establishing a preselected degree of coincidence, on a digit by digit basis, to control any desired external device or devices when a preselected degree of coincidence is established. While a preferred embodiment of a sequence detector and output enable 13 will be discussed with particularity for use within a specified environment, it is to be understood that any device capable of operating on the output signal of comparator 12 to establish a preselected degree of coincidence and provide a signal indicative of that degree of coincidence may be employed as sequence detector and output enable 13.

Figure 2:
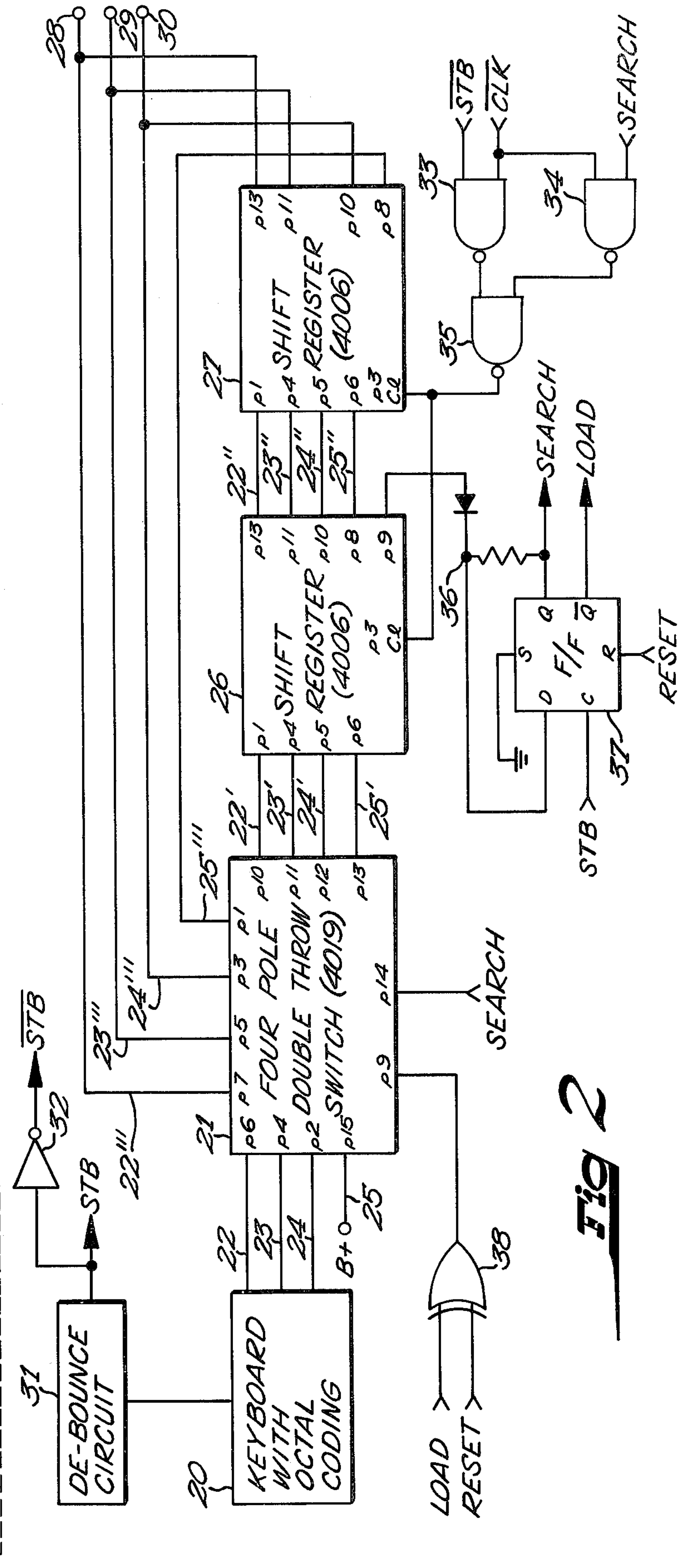
FIG. 2 illustrates a preferred embodiment of a functional element illustrated in FIG. 1.

Referring now to FIG. 2, there is shown a preferred embodiment of input or access channel 10 and its generation and utilization of associated control signals. Input 16 and octal coder 17 (See FIG. 1) are illustrated as a keyboard with octal coding 20. The keyboard may be provided with a plurality of push buttons connected with circuitry for providing eight different octal coded digits, in known manner. For example, the keyboard may be provided with nine push buttons labeled 1–9 with the depression of the push button labeled "1" resulting in an octal coded 1, the depression of the push button labeled 2 resulting in an octal coded 2 and so on for push buttons 1–8. The push button labeled 9 may be connected to result in any octal coded digit 1–8, 8, for example.

Octal coded digits resulting from depression of push buttons on keyboard 20 are applied to a four pole double-throw switch 21 via lines 22, 23 and 24. An input terminal 25 of switch 21 is connected to a positive source of voltage B+. As will be explained more fully below, during the entry of a code sequence at keyboard 20, during the LOAD cycle, the switch 21 is connected to apply the signals appearing on lines 22–24 and terminal 25 to a shift register 26 via lines 22'–25'. Lines 22"–25" connect the outputs of shift register 26 to a shift register 27 whose outputs are connected via lines 22'"–25'" to switch 21. Lines 22'", 23'" and 24'" are also connected to terminals 28, 29 and 30, respectively. Each of the primed and unprimed lines and terminals 22–25 are connected to transmit to their associated elements signals appearing on lines having the same reference numeral. For example, line 22' transmits from the switch 21 to shift register 26 that signal first appearing on line 22, while line 22" transmits from shift register 26 to shift register 27, that signal first appearing on line 22 and line 22'. After entry of a complete code sequence at keyboard 20, during the SEARCH cycle, switch 21 will be connected to apply the output of shift register 27 appearing on lines 22'"–25'" to a like reference numeral ones of lines 22'–25'.

With each depression of a push button on keyboard 20, the fact of a depression of a push button will be transmitted to de-bounce circuit 31, whose function is well-known, and result in a strobe signal (STB). An inverter 32 connected to the output of de-bounce circuit 31 provides an inverse strobe signal ($\overline{STB}$).

The STB signal is applied as one input to a NAND gate 33. As will be described more fully below, a system clock pulse generator is enabled after the entry of a complete code sequence at keyboard 20 to produce system clock pulses (CLK) and their inverse ($\overline{CLK}$). Also after entry of a complete code sequence, a SEARCH signal is produced. The SEARCH signal is applied as one input to a NAND gate 34 and the $\overline{CLK}$ signal is applied as the other input to NAND gates 33 and 34. The output of NAND gates 33 and 34 are connected as inputs to a NAND gate 35 whose output is connected to the clock terminals (cl) of shift registers 26 and 27. Thus, during entry of each digit at the keyboard 20, an STB signal is produced resulting in a clock pulse to each of shift registers 26 and 27 causing each input to shift through shift register 26 and into shift register 27. An additional output of shift register 26 is connected via a diode to a junction 36. Junction 36 is connected to the D input terminal of a flip-flop 37 and to its Q output terminal via a resistor. The C input terminal of flip-flop 37 is connected to receive the STB signal while its set terminal is grounded. The reset terminal of flip-flop 37 is connected to receive a RESET signal which will be described more fully below. The signal appearing at the Q terminal of flip-flop 37 is the SEARCH signal while the signal appearing at the $\overline{Q}$ terminal of flip-flop 37 is the LOAD signal, both indicative of cycles described above. The SEARCH signal is applied to the switch 21 and causes the switch to apply the signals appearing on lines 22'"–25'" to the lines 22'–25' when it is high. The LOAD and RESET signals are applied as inputs to an exclusive OR gate 38 whose output causes the switch to apply the signals appearing on lines 22–24 and terminal 25 to the lines 22'–25' when either is high. Thus, during the LOAD cycle, the keyboard 20 is connected directly to the shift register 26 while during the SEARCH cycle the output of shift register 27 is connected to the input of shift register 26.

In operation, and assuming no $\overline{CLK}$ and RESET signals, and as initial conditions, the SEARCH signal is low and the LOAD signal is high, each keyboard entry will be presented to shift register 26 and shifted through register 26 on each subsequent keyboard entry and STB signal. When five entries have been made, the ouput of shift register 26 connected to junction 36 goes high applying a high input to the D input of flip-flop 37. On the next keyboard entry, the resulting STB signal will cause the flip-flop 37 to toggle and the SEARCH signal will go high and the LOAD signal will go low. With the SEARCH signal high, and the LOAD signal low, the switch 21 will apply the outputs of shift register 27 to the inputs of shift register 26 thus allowing the cycling of an entered code sequence through the shift registers 26 and 27 and the presentation of that code sequence to the terminals 28–30 every eight clock pulses applied to the clock terminals (cl) of shift registered 26 and 27.

As stated above, when the SEARCH signal goes high, the system clock pulse generator is enabled and its inverse output ($\overline{CLK}$) is applied to NAND gates 33 and 34 and results in the clock pulses for the shift registers 26 and 27. In the illustrated embodiment, a code sequence of six octal digits, as entered at keyboard 20, are presented to the terminals 28–30 in repeating cycles every eight system clock pulses (CLK). Of course, the full eight digit capacity of the shift registers 26 and 27 could be employed, or fewer than six might be employed, the corresponding alteration to control the toggling of flip-flop 37 at the appropriate time being within the skill of one familiar with the art. However, it is believed that a six digit code sequence is adequate to minimize unauthorized use while being easier to remember than a seven or eight digit code sequence. For example, a six digit code sequence provides over one-quarter million different code sequences that can be entered at the keyboard.

Figure 3:
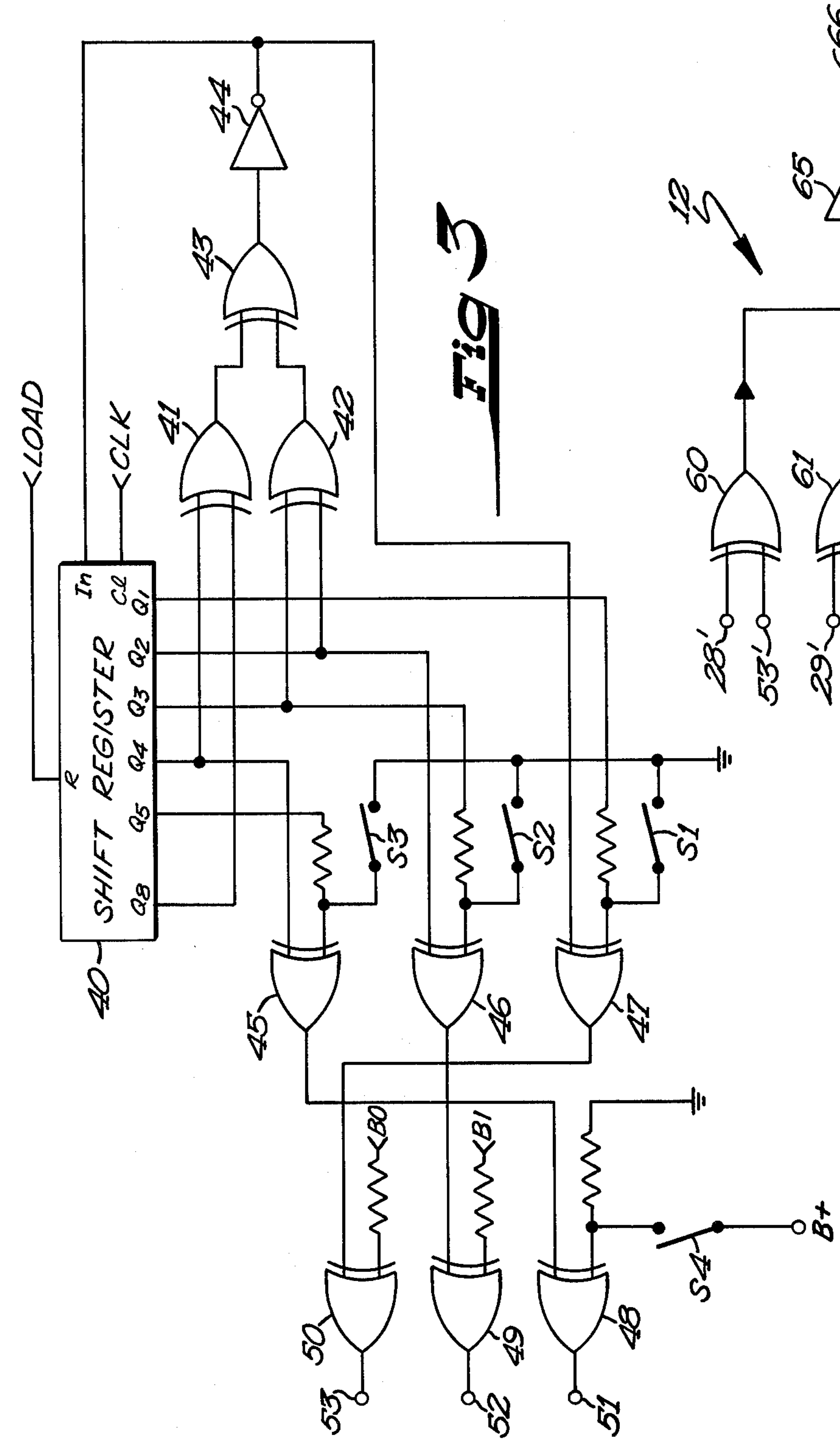
FIG. 3 illustrates a preferred embodiment of a further functional element of FIG. 1.

Having now described a preferred embodiment of an access channel 10 of FIG. 1 in which a six digit code sequence is entered and cyclically presented to output terminals 28–30 every eight CLK pulses, reference is now made to FIG. 3 which illustrates a preferred embodiment of the code sequence generating channel 11 of FIG. 1. To avoid the necessity of memory circuits and the additional circuitry necessary to address the various memory storage locations, the preferred embodiment of FIG. 3 employs a pseudo-random code generator of the type known to the prior art and octal coding circuitry to be described below. An eight bit shift register 40 has its RESET terminal connected to the LOAD signal and its clock terminal (cl) connected to receive the CLK signal. The Q4 output terminal of shift register 40 is connected as one input to an exclusive OR gate 41 while the Q8 output of shift register 40 is connected as the other input of exclusive OR gate 41. Similarly, the Q2 and Q3 outputs of shift register 40 are connected as the inputs to an exclusive OR gate 42. The outputs of exclusive OR gates 41 and 42 are connected as the inputs to an exclusive OR gate 43 whose output is connected to an inverter 44. The output of inverter 44 is connected to the input terminal of shift register 40 and is shifted through its output terminals Q1–Q8 in response to CLK pulses. The connection of shift register 40 and gates 41–44 is a pseudo-random code generator of a type known to the prior art and produces a chain of highs and lows at the output of gate 44 that is random and repeats only after it has reached 255 bits. Through the connection of the output of gate 44 to the input terminal of shift register 40, the pseudo-random chain is shifted through shift register 40 to appear at each of its output terminals Q1–Q8. To produce octal digits it is only necessary to select three points anywhere in the shift register. These digits can be compared with the input in channel 10 in eight digit cycles to establish the degree of coincidence between the entered code sequence and each generated eight digit code sequence. It should be noted that exclusive OR gates are employed in the circuitry of FIG. 3 since they give an even distribution of highs and lows for all input combinations, and, for randomness, it is important that the distribution be even.

An exclusive OR gate 45 has one of its inputs connected to the Q4 output of shift register 40 and its other input connected to Q5 output of shift register 40 via a resistor. Similarly, an exclusive OR gate 46 has one of its inputs connected to the Q2 output of shift register 40 and its other input is connected, via a resistor, to the Q3 output of register 40. An exclusive OR gate 47 has one of its inputs connected to the output of exclusive OR gate 44 and its other input is connected to the Q1 output of shift register 40 via a resistor. That input of gates 45, 46 and 47 connected to an output of shift register 40 via a resistor may be independently connected to ground by the closing of switches S3, S2 and S1, respectively.

The output of exclusive OR gates 45, 46 and 47 are each connected as one input to exclusive OR gates 48, 49 and 50, respectively. The other input of exclusive OR gate 48 is connected to ground via a resistor and to a positive voltage supply B+ via switch S4. The other input of exclusive OR gates 50 and 49 are connected via resistors to signals B0 and B1, respectively. The outputs of exclusive OR gates 48, 49, and 50 are connected to terminals 51, 52 and 53, respectively.

Figure 5:
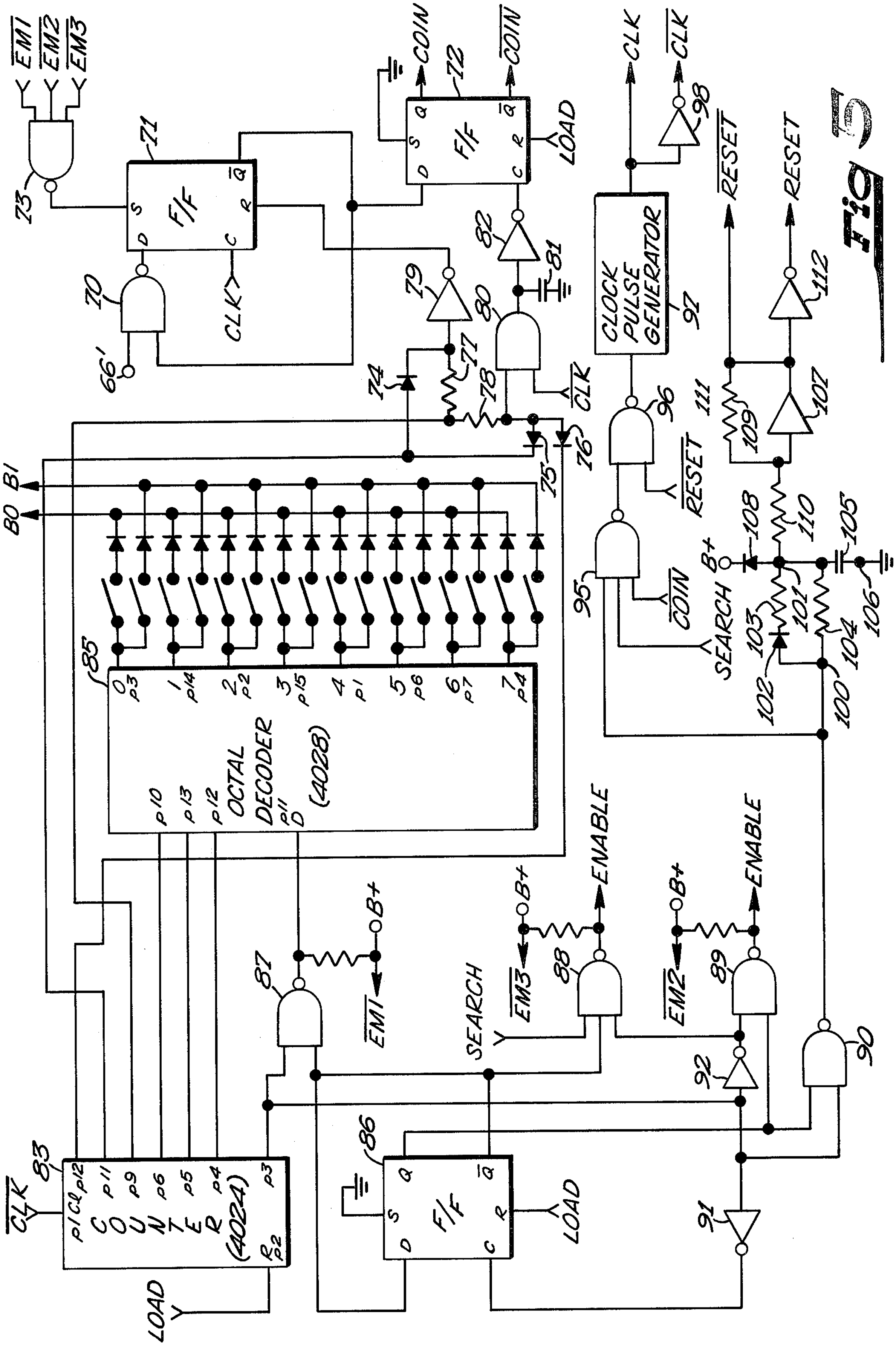
FIG. 5 illustrates a preferred embodiment of yet another functional element of FIG. 1.

As will be apparent to those skilled in the art, various open and closed combinations of switches S1–S4 causes the generation of sixteen different sets of digits at the output terminals 51–53. Thus, switches S1–S4 may be employed to collectively alter the generated code sequences. Signals B0 and B1, whose generation is discussed below with reference to FIG. 5, are employed within the illustrated preferred embodiment to alter one code sequence of eight digits within the totality of the generated code series or sequences.

As described to this point, the preferred embodiment of entry channel 10 illustrated in FIG. 2 accepts an entered code sequence of six digits and cycles that entered code sequence to present it to output terminals 28–30 once during every eight CLK pulses. The circuitry of FIG. 3, generates a pseudo-random code series, one digit on each CLK pulse, which may be collectively altered to present sixteen different code series to terminals 50–53 through the selection of switches S1–S4. The signals appearing at terminals 28–30 may be compared to the signals appearing at terminals 51–53 on an eight digit repeating cycle, and, in this manner, the signals appearing at terminals 51–53 may be viewed as a sequential plurality of preselected code sequences of eight digits each. The comparator 12 of FIG. 1 may be employed to indicate the degree of coincidence between the entered code sequence and each eight digit code sequence appearing at the terminals 51–53.

Figure 4:
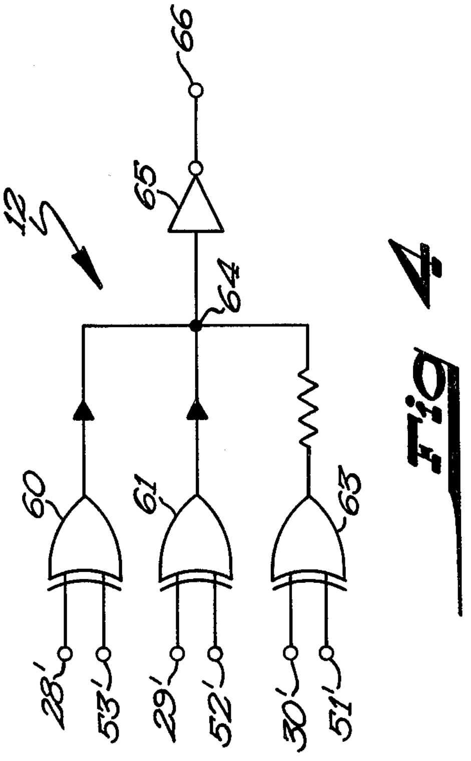
FIG. 4 illustrates a preferred embodiment of still another functional element of FIG. 1.

Referring now to FIG. 4, there is shown a preferred embodiment of the comparator 12 of FIG. 1. An exclusive OR gate 60 has its inputs connected to terminals 28′ and 53′. A second exclusive OR gate has its inputs connected to terminals 29′ and 52′ while a third exclusive OR gate 63 has its inputs connected to terminals 31′ and 51′. Terminals 28′–30′ and 51′–53′ are adapted for connection to unprimed terminals of like reference numerals shown in FIGS. 2 and 3. Thus, each exclusive OR gate 60–63 receives one input from input channel 10 illustrated in FIG. 2 and one input from generated code sequence channel 11 illustrated in FIG. 3. Exclusive OR gates 60 and 61 are connected to a junction 64 via diodes while exclusive OR gate 63 is connected to junction 64 via a resistor. Junction 64 is connected to an inverter 65 whose output is connected to a terminal 66.

Comparator 12 illustrated in FIG. 4 is an octal comparator with each of gates 60–63 having one input connected to each of the channels 10 and 11 of FIG. 1. The comparator of FIG. 4, in particular gates 60–63, compare on a digit by digit basis the output of channels 10 and 11 of FIG. 1 and produce a low at junction 64 in the event of a total digit coincidence. A low at junction 64 results in a high at terminal 66, the high at terminal 66 indicating coincidence between a digit in channel 10 and channel 11 of FIG. 1. Conversely, in the event of non-coincidence of a digit in channel 10 and channel 11 of FIG. 1, junction 64 is high resulting in a low at terminal 66, an indication of noncoincidence. Thus, the signal at terminal 66, and particularly the number of highs versus the number of lows at terminal 66 during an eight digit sequence appearing at terminals 51–53, is representative of the degree of coincidence between an eight digit sequence appearing at terminals 51–53 and the signal entered into channel 10 of FIG. 1.

Referring now to FIG. 5, there is shown a preferred embodiment of a sequence detector and output enable 13 as illustrated in FIG. 1, the circuitry illustrated in FIG. 5 being particularly preferred in the environment of a single fluid handling pump which is enabled by one of 24 preselected code sequences while providing for individual monitoring of the amount of fluid pumped as a result of the entry of each of the 24 preselected code sequences. A terminal 66' is adapted for connection to terminal 66 of FIG. 4 and is connected as an input to a NAND gate 70. The output of NAND gate 70 is connected to the D input of a flip-flop 71 whose $\overline{Q}$ output is connected as the other input to NAND gate 70 and as the D input of a flip-flop 72. The C terminal of flip-flop 71 is connected to the CLK signal while its set terminal (S) is connected to the output of a NAND gate 73 having as inputs $\overline{EM1}$, $\overline{EM2}$ and $\overline{EM3}$, signals to be described more fully below. The set terminal (S) of flip-flop 72 is connected to ground while its reset terminal (R) is connected to the LOAD signal. The Q terminal of flip-flop 72 provides a coincidence signal (COIN) while its $\overline{Q}$ terminal provides a non-coincidence signal ($\overline{COIN}$). The signal appearing at terminal 66' is representative of the degree of coincidence of the six digit sequence entered in channel 10 of FIG. 1 with six of the digits of each eight digit sequence generated in channel 11. Flip-flops 71 and 72 detect a string of six correct digits causing the Q terminal of flip-flop 72 to go high when the coincidence of six such digits are detected resulting in the COIN signal. As will be described more fully below, flip-flop 71 is reset after every eight digits generated in channel 11 of FIG. 1 while a clock signal is applied to the C input flip-flop 72 after each eight generated digits.

Still referring to FIG. 5, a counter 83 has its clock terminal (cl) connected to receive $\overline{CLK}$ signals while the LOAD signal is connected to its reset terminal (R). The first three outputs of counter 83 (pins p12, p11 and p9) represent the position of a digit within each eight digit sequence generated within channel 11 of FIG. 1 and are connected to a network of diodes 74, 75 and 76, resistances 77 and 78, inverter 79, NAND gate 80, capacitor 81, and inverter 82. The $\overline{CLK}$ signal is also applied as an input to NAND gate 80. As will be apparent to those familiar with the art, the network of elements 74–82 will reset the flip-flop 71 after every eighth digit generated in channel 11 of FIG. 1 and provide a clock pulse to the C terminal of flip-flop 72, with a time delay provided by capacitor 81, after every eighth such digit.

The second three outputs of counter 83 (pins p6, p5 and p4) correspond to which set of eight digit sequences in channel 11 is being decoded. The three bits at these outputs of counter 83 are each transmitted to three octal decoders 85 (one shown) whose individual outputs 0–7 go high, sequentially, under the control of counter 83 when the decoders are enabled. The decoders 85 are enabled when their D terminal (pin p11) goes low.

Counter 83 is a seven bit counter and forms an eight bit counter in combination with a flip-flop 86, in known manner. The seventh output of counter 83 (pin p3) and the output of flip-flop 86 determine which of the three modules 85 are to be enabled in combination with NAND gates 87–89, and inverters 91 and 92. When the output of NAND gate 87 goes low, the illustrated decoder 85 is enabled causing its outputs 0–7 to be sequentially enabled until the preselected degree of coincidence is established by flip-flops 71 and 72. Similarly, NAND gate 89 provides an enable signal for a second module (not shown) while NAND gate 88 provides an enable signal for a third module (not shown). In this manner, three decoders 85, each having eight function controlling outputs, allows the enablement of 24 functions in predetermined correspondence with rank of an eight digit sequence within the series of digits generated in channel 11 of FIG. 1. Further, each of the outputs 0–7 of decoders 85 are connected by switches and diodes to produce signals B0 and B1 to individually alter an eight digit sequence within the series of digits generated in channel 11 of FIG. 1. That is, when one of outputs 0–7 of decoder 85 goes high, the setting of the switches connected to that output may be used to alter the eight digit generated sequence corresponding to that output.

Signals $\overline{EM1}$, $\overline{EM2}$ and $\overline{EM3}$ are the enable signals for decoders 85. One, two or three decoders 85 may be employed, each being enabled by a different enable signal. When three decoders 85 are employed, each of the signals $\overline{EM1}$, $\overline{EM2}$ and $\overline{EM3}$ are connected to a positive voltage supply B+ as shown in FIG. 5. When less than three decoders 85 are employed, only those enable signals which correspond to the decoders in use are connected to the positive voltage supply B+. In this manner, the output of gate 73 will go high and set flip flop 71 during the entire sequence of codes corresponding to a decoder which is not connected thereby disabling the sequence detecting circuitry during the corresponding time period.

The output of a NAND gate 90 is connected to circuitry that generates the system CLK and RESET signals. The inputs of NAND gate 90 are connected to the Q output of flip-flop 86 and the seventh output of counter 83. The output of NAND gate 90 is connected as one input to a NAND gate 95 having as additional inputs the SEARCH and $\overline{COIN}$ signals. The output of NAND gate 95 is connected as one input to a NAND gate 96 having as a second input, the $\overline{RESET}$ signal. The output of NAND gate 96 is connected to a clock pulse generator 97 whose output is the $\overline{CLK}$ signal. The CLK signal is also inverted by an inverter 98 to provide the CLK signal. The clock pulse generator 97 is enabled during the SEARCH cycle and disabled on the establishment of a preselected degree of coincidence by flip-flops 71 and 72 as well as on a resetting of the system elements resulting from an entered code sequence not having the preselected degree of coincidence with any of the sequentially generated eight digit code sequences of channel 11.

The system RESET signal is also controlled by the output of NAND gate 90. The output of NAND gate 90 is connected to a junction 100. The junction 100 is connected to a junction 101, by a diode 102 and resistor 103, and by a parallel connected resistor 104. A capacitor 105 connects junction 101 to ground. Junction 101 is also connected by a diode 108 to a positive voltage supply B+ and to a junction 109 via a resistor 110. Junction 109 is connected as the input to buffer gate 107 and, by resistor 111 to the output of buffer gate 107. The output of buffer gate 107 serves as the $\overline{RESET}$ signal and is connected to an inverter 112. The output of inverter 112 serves as the RESET signal. The buffer gate 107 and resistors 110 and 111 form a Schmidt trigger in known manner.

The output of NAND gate 90 goes low when an entered code sequence does not have the preselected degree of coincidence with a generated code sequence whose rank will enable one of decoders 85. The output of NAND gate 90 going low results in a disabling of clock pulse generator 97 and discharging of capacitor 105, the discharge of capacitor 105 providing a delay in which the entire system is disabled to prevent the immediate entry of an additional code sequence at keyboard 20.

Each of the outputs 0–7 of decoders 85 may be employed to enable a separate function. Thus, with the illustrated preferred embodiment, 24 different functions may be selectively enabled with the entry of a preselected code sequence for each function at keyboard 20. The intended environment of the preferred embodiment is the enablement of a fluid handling pump with any one of the twenty four operable code sequences with the individual enablement of 24 separate counters to maintain a record of the amount of fluid pumped as the result of the entry of each preselected code sequence. Suitable fluid handling pumps and counters are known to the prior art.

The present invention provides a unique system which eliminates external devices such as keys and cards for the selective enablement of preselected functions in accordance with the entry of a preselected code sequence and which requires no internal memory, and the attending storage location addressing circuitry, by which to establish the entry of a preselected code sequence. A code sequence is externally entered and cyclically compared against a plurality of internally generated code sequences to selectively enable a given function on the establishment of a preselected degree of coincidence between the entered code sequence and one of the internally generally code sequences. The rank of the preselected code sequence having the preselected degree of coincidence with the externally entered code sequence establishes the function to be enabled.

It is presently contemplated that the invention may be practiced to advantage by employing, for circuit elements 21, 26, 27, 83 and 85, those components, or their equivalent, having the RCA part designation indicated in parenthesis thereon. Register 40 may be formed, in known matter, by two four-bit shift registers (RCA 4015). The selection of other circuit components is within the skill of those familiar with the art. Within the designated components, the reference numerals preceded by a p (i.e. p 10) are references to the manufacturer's pin designations.

Obviously, many modifications and variations of the present invention are possible in light of the above teachings. For example, given the preferred code sequence entry channel 10 of FIG. 2, the preferred code sequence generating channel 11 of FIG. 3 and the preferred embodiment of comparator 12, as illustrated in FIG. 4, any device capable of detecting a preselected degree of coincidence may be employed to enable the desired function. It is therefore to be understood that, within the scope of the appended claims, the invention may be practiced at otherwise than as specifically described.

What is claimed is:

1. In a device for obtaining limited access to a plurality of functions in response to the external entry of preselected code sequences of the type having means for entering a code sequence and means for selectively enabling said functions in response to said entered code sequences, the improvement which comprises:

means for sequentially generating a plurality of preselected code sequences, each having a higher rank than all prior generated code sequences;

means for individually comparing said generated code sequences with an entered code sequence to establish their degree of coincidence therewith; and means responsive to said comparing means for enabling said functions on the occurrance of a preselected degree of coincidence between a generated code sequence and an entered code sequence in predetermined correspondence with rank of a generated code sequence having said preselected degree of coincidence with said entered code sequence.

2. The device of claim 1 further comprising means for storing an entered code sequence, said storing means including means for presenting a stored code sequence to said comparing means during each generated code sequence.

3. The device of claim 1 wherein said generating means sequentially generates a plurality of preselected, non-repeating code sequences.

4. The device of claim 3 further comprising means for storing an entered code sequence, said storing means including means for presenting a stored code sequence to said comparing means during each generated code sequence.

5. The device of claim 1 wherein said generating means comprises pseudo-random code generating means.

6. The device of claim 5 further comprising means for storing an entered code sequence, said storing means including means for presenting a stored code sequence to said comparing means during each generated code sequence.

7. The device of claim 1 wherein said generating means comprises selective means for collectively altering said generated code sequences.

8. The device of claim 7 wherein said generating means comprises pseudo-random code generating means.

9. The device of claim 7 wherein said generating means further comprises selective means for individually altering said generated code sequences.

10. The device of claim 9 wherein said generating means comprises pseudo-random code generating means.

11. The device of claim 10 further comprising means for storing an entered code sequence, said storing means including means for presenting a stored code sequence to said comparing means during each generated code sequence.

12. The device of claim 1 wherein said generating means comprises selective means for individually altering said generated code sequences.

13. In apparatus responsive to externally entered code sequences for selectively enabling a plurality of functions in predetermined correspondence with the entry to preselected code sequences, means for detecting the entry of said preselected code sequences which comprises:

means for storing an entered code sequence;

means for sequentially generating a plurality of preselected code sequences;

comparator means connected to receive each generated code sequence to individually establish their degree of conincidence with said entered code sequence, said storing means comprising means for presenting said entered code sequence to said comparator means during each generated code sequence; and means responsive to said comparator means for enabling said functions on the occurrence of a preselected degree of coincidence between a generated code sequence and an entered code sequence in predetermined correspondence with the rank of a generated code sequence having said preselected degree of coincidence with said entered code sequence.

14. Apparatus according to claim 13 wherein said code sequence generating means is disabled on the establishment of said preselected degree of coincidence of said entered code sequence with one of said generated code sequences.

15. Apparatus according to claim 14 wherein said storing means comprises shift register means and means for cycling said entered code sequence through said shift register means during each generated code sequence.

16. Apparatus according to claim 15 wherein said generating means sequentially generates a plurality of preselected, non-repeating code sequences.

17. Apparatus according to claim 15 wherein said generating means comprises pseudo-random code generating means.

18. Apparatus according to claim 17 wherein said generating means further comprises selective means for collectively altering said generated code sequences.

19. Apparatus according to claim 18 wherein said generating means further comprises selective means for individually altering said generated code sequences.

20. Apparatus according to claim 13 wherein said generating means comprises pseudo-random code generating means.

21. Apparatus according to claim 20 wherein said generating means further comprises means for collectively altering said generated code sequences.

22. Apparatus according to claim 21 wherein said generating means further comprises selective means for individually altering said generated code sequences.

23. Apparatus according to claim 22 further comprising means for indicating the establishment of a preselected degree of coincidence of said entered code sequence with one of said generated code sequences.

24. Apparatus according to claim 20 wherein said generating means further comprises selective means for individually altering said generated code sequences.

25. Apparatus responsive to externally entered code sequences for selectively enabling a plurality of functions in predetermined correspondence with the entry of preselected code sequences which comprises:

keyboard means for external entry of a code sequence;

means for storing an externally entered code sequence;

means for sequentially generating a plurality of preselected code sequences;

comparator means for establishing the relative coincidence between said entered code sequence and each of said generated code sequences;

means for indicating the establishment of a preselected degree of coincidence between said entered code sequence; and means responsive to the order of code sequence generation for enabling said functions in accordance with the rank of a generated code sequence within said generation order which has said preselected degree of coincidence with said entered code sequence.

26. Apparatus according to claim 25 wherein said code sequence generating means is disabled on the establishment of said preselected degree of coincidence of said entered code sequence with one of said generated code sequences.

27. Apparatus according to claim 26 wherein said storing means comprises shift register means and means for cycling said entered code sequence through said shift register means during each generated code sequence.

28. Apparatus according to claim 25 wherein said keyboard means and said generating means each comprise octal coding means.

29. Apparatus according to claim 28 wherein said generating means sequentially generates a plurality of preselected, non-repeating code sequences.

30. Apparatus according to claim 28 wherein said generating means comprises pseudo-random code generating means.

31. Apparatus according to claim 28 wherein said generating means further comprises selective means for collectively altering said generated code sequences.

32. Apparatus according to claim 31 wherein said generating means further comprises selective means for individually altering said generated code sequences.

33. Apparatus according to claim 28 wherein said generating means further comprises selective means for individually altering said generated code sequences.

34. Apparatus according to claim 25 further comprising means for disabling said indicating means during preselected ones of said plurality of preselected code sequences.

* * * * *